United States Patent
Frezza et al.

(10) Patent No.: US 11,664,676 B2
(45) Date of Patent: May 30, 2023

(54) POE EMERGENCY POWER SYSTEMS AND RELATED METHODS

(71) Applicant: MOLEX, LLC, Lisle, IL (US)

(72) Inventors: Giovanni Frezza, Buffalo Grove, IL (US); Ashish Patankar, Naperville, IL (US); Anthony Mackey, Downers Grove, IL (US); Vince Chavez, Chicago, IL (US); Gene Schneider, Wheeling, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 17/383,489

(22) Filed: Jul. 23, 2021

(65) Prior Publication Data
US 2022/0029453 A1    Jan. 27, 2022

Related U.S. Application Data

(60) Provisional application No. 63/055,903, filed on Jul. 24, 2020.

(51) Int. Cl.
*H02J 9/06* (2006.01)
*H04L 12/10* (2006.01)
*H05B 47/18* (2020.01)
*F21S 9/02* (2006.01)
*H05B 45/30* (2020.01)

(52) U.S. Cl.
CPC .............. *H02J 9/061* (2013.01); *F21S 9/022* (2013.01); *H04L 12/10* (2013.01); *H05B 47/18* (2020.01); *H05B 45/30* (2020.01)

(58) Field of Classification Search
CPC .......... H04L 12/10; H05B 47/18; H02J 9/065; H02J 9/061; H02J 9/06; H02J 9/08; F21S 9/022
See application file for complete search history.

(56) References Cited

U.S. PATENT DOCUMENTS

| | | | |
|---|---|---|---|
| 2010/0117808 A1* | 5/2010 | Karam | H04L 12/10 713/300 |
| 2018/0054083 A1* | 2/2018 | Hick | H05B 47/185 |
| 2019/0181773 A1* | 6/2019 | Kawai | H02J 3/38 |

FOREIGN PATENT DOCUMENTS

WO    WO-2017151314 A1 *  9/2017  ............. H02M 1/10

* cited by examiner

*Primary Examiner* — Ryan Johnson

(57) ABSTRACT

Emergency power control systems enable Power-over-Ethernet (PoE) devices to be powered by primary and emergency power sources.

20 Claims, 11 Drawing Sheets

POE EMERGENCY POWER SYSTEMS AND RELATED METHODS

RELATED APPLICATIONS

This application claims priority to U.S. Provisional Application 63/055,903, filed Jul. 24, 2020, which is incorporated herein by reference in its entirety.

TECHNICAL FIELD

This disclosure relates to features and operation of systems that provide emergency power to Power-over Ethernet (PoE) systems, such as LED lighting systems, for example.

INTRODUCTION

This section introduces aspects that may be helpful to facilitate a better understanding of the disclosed embodiments. Accordingly, the statements in this section are to be read in this light and are not to be understood as admissions about what is, or what is not, in the prior art.

It is a challenge to provide emergency power to devices within a PoE system or network.

SUMMARY

Various exemplary embodiments that provide emergency power to PoE devices, systems and networks are described herein.

For example, one embodiment of an emergency PoE, power control system may comprise: an electronic emergency power distribution module configured to (i) receive emergency DC power from an AC-to-DC conversion stage and primary DC PoE power ("primary DC power") from an electronic, primary DC driver, (ii) monitor the presence and absence of primary DC power, and (iii) provide the primary DC power or the emergency DC power to one or more load devices (e.g., one or more LED, solid state lights).

Such an emergency PoE, power control system may further comprise an electronic AC-to-DC conversion stage which may be located remote from the electronic emergency power distribution module, for example. The AC-to-DC conversion stage may comprise a plurality of AC-DC conversion units, where each unit may be operable to receive an emergency AC power signal from an emergency AC power source and convert a respective, received AC power signal to a DC power signal and output the DC power signal as an emergency DC power signal to a respective emergency, PoE power control module, for example.

The emergency power control module in this embodiment may comprise on-board relay control circuitry for detecting the presence and absence of the primary DC power and controlling an on-board relay module in order to connect primary DC power and/or emergency DC power to the one or more load devices. The on-board relay control circuitry may be further operable to detect that the primary DC power is present or absent by sensing signals received via Core Sync® bus input/output signals, for example.

In more detail, in one embodiment the on-board relay control circuitry may be further operable to detect signals indicating that the primary DC power is not, or no longer, present (collectively "not present") and to generate, and send, one or more first relay control signals to the on-board relay module. Upon receiving the first control signals the on-board relay module may be operable to disconnect the primary DC power and connect the emergency DC power. Conversely, the on-board relay control circuitry may be further operable to detect signals indicating that the primary DC power is present and to generate, and send, one or more second relay control signals to the on-board relay module. Upon receiving the second control signals the on-board relay module may be operable to disconnect the emergency DC power and connect the primary DC power.

Another embodiment of an emergency PoE, power control system may comprise: an electronic emergency power control and driving module that may comprise an integral, primary electronic DC PoE power driving module, and an integral, electronic relay control module configured to (i) receive primary DC PoE power ("primary DC power") from the integral driving module and emergency DC power, (ii) monitor the presence and absence of the primary DC power, and (iii) provide the primary DC power or the emergency DC power to one or more load devices (e.g., one or more LED, solid state lights). In this embodiment the emergency PoE, power control system may further comprise an integral, electronic AC-to-DC conversion stage operable to receive emergency AC power and convert the received, emergency AC power into the emergency DC power.

In this embodiment the integral, electronic relay control module may comprise an on-board, emergency electronic driving module, an on-board relay module and on-board relay control circuitry for detecting the presence and absence of primary DC power and controlling the on-board relay module in order to connect the primary DC power or emergency DC power to the one or more load devices. The on-board relay control circuitry may be further operable to detect that the primary DC power is present or absent by sensing signals received via Core Sync® bus input/output signals, for example.

In more detail, in this embodiment the on-board relay control circuitry may be further operable to detect signals indicating that the primary DC power is not present and to generate, and send, one or more first relay control signals to the on-board relay module. Upon receiving the first control signals, the on-board relay module may be operable to disconnect the primary DC power and connect the emergency DC power, for example. Conversely, the on-board relay control circuitry may be further operable to detect signals indicating that the primary DC power is present and to generate, and send, one or more second relay control signals to the on-board relay module. Upon receiving the second control signals the on-board relay module may be operable to disconnect the emergency DC power and connect the primary DC power, for example.

In yet another embodiment, an emergency PoE, power control system may comprise: an electronic power distribution section operable to detect the presence or absence of primary AC power and for distributing emergency DC power; and an electronic emergency power control module operable to provide primary DC PoE power or the emergency DC power to one or more electrical load devices (e.g., one or more LED, solid state lights).

The electronic power distribution section may comprise one or more AC-to-DC conversion units operable to receive emergency AC power from a first emergency AC power source and convert the received AC power into the emergency DC power. In addition, the electronic power distribution section may further comprise an electronic power sensing module operable to detect the presence or absence of the primary AC power. In more detail, in this embodiment the electronic power sensing module may be operable to detect primary AC power is not present and connect a first emergency AC power source, or, conversely, the electronic power sensing module may be operable to detect primary AC power is present and disconnect the first emergency AC power source.

In an embodiment the emergency power control module may comprise at least on-board relay circuitry and on-board relay triggering circuitry for triggering the on-board relay circuitry to switch from the primary DC power to the emergency DC power or vice-versa.

An emergency PoE, power control system may comprise more than one emergency AC power source. In one embodiment the system may comprise a second emergency AC power source and a PoE switch, the second emergency AC power source providing supplemental AC power to the PoE switch, the PoE switch operable to convert the supplemental AC power into supplemental DC power to power one or more load devices (e.g., one or more LED, solid state lights), wherein the second emergency AC power source provides the supplemental AC power until primary AC power is at a voltage sufficient to power the one or more load devices at a rated output. As used in embodiment disclosed hereon, the phrase "rated output" means a power that is output at a current and voltage that correctly matches the current and voltage requirements of a particular LED light fixture or another device that receives power from an emergency PoE, power control system disclosed herein and equivalent systems.

In still another embodiment, an emergency power control module of an emergency PoE, power control system may comprise on-board, primary electronic LED driver and control circuitry, on-board, emergency electronic driving module, on-board relay circuitry and on-board relay triggering circuitry for triggering the relay circuitry to switch from the primary DC power to the emergency DC power or vice-versa. In this embodiment the on-board primary electronic LED driver and control circuitry may comprise a microcontroller, communication circuitry and power circuitry and may be operable to control primary DC power output to one or more load devices (e.g., one or more LED, solid state lights). Further, the on-board relay triggering circuitry may be further operable to sense the presence or absence of the emergency DC power.

In more detail, in one embodiment the on-board relay triggering circuitry may be operable to detect the presence of emergency DC power and to generate and send one or more first relay control signals to the on-board relay circuitry indicating that the emergency DC power is present and has a voltage sufficient to power the one or more load devices at a rated output. Upon receiving the first control signals, the on-board relay circuitry may be operable to disconnect the primary DC power and connect the emergency DC power. Conversely, the on-board relay triggering circuitry may be operable to detect that emergency DC power is not present and to generate and send one or more second relay control signals to the on-board relay circuitry indicating that the emergency DC power is not present. Upon receiving the second control signals, the on-board relay circuitry may be operable to disconnect the emergency DC power and connect the primary DC power, for example.

In an additional embodiment, an emergency power control module of an emergency PoE, power control system may comprise on-board, primary electronic LED driver control circuitry, an on-board electronic relay module, on-board LED driver circuitry positioned after the relay module and on-board relay triggering circuitry, wherein the on-board relay triggering circuitry may be operable to trigger the relay module to switch from primary DC power to emergency DC power or vice-versa.

The on-board relay triggering circuitry may be further operable to sense the presence or absence of the emergency DC power. For example, the on-board relay triggering circuitry may be operable to detect the presence of emergency DC power and to generate and send one or more first relay control signals to the on-board relay module indicating that the emergency DC power is present and has a voltage sufficient to power the one or more load devices at a rated output. Upon receiving such first relay control signals, the on-board relay module may be operable to disconnect primary DC power and connect emergency DC power. Conversely, the on-board relay triggering circuitry may be operable to detect that emergency DC power is not present and to generate and send one or more second relay control signals to the on-board relay module indicating that the emergency DC power is not present. Upon receiving such second relay control signals the on-board relay module may be operable to disconnect the emergency DC power and connect the primary DC power.

BRIEF DESCRIPTION OF THE DRAWINGS

The present disclosure may be illustrated by way of example in the accompanying figures in which like reference numerals indicate similar elements and in which.

Specific embodiments of the present disclosure are set forth herein with reference to various figures and sketches. Both the description and the illustrations have been drafted with the intent to enhance understanding. For example, the dimensions of some of the elements in the figures may be exaggerated relative to other elements, and well-known elements that are beneficial or even necessary to a commercially successful implementation may not be depicted so that a less obstructed and a more clear presentation of embodiments may be achieved. Further, dimensions and other parameters described herein are merely exemplary and non-limiting.

DETAILED DESCRIPTION

Simplicity and clarity in both illustration and description are sought to effectively enable a person of skill in the art to make, use, and best practice embodiments of the present disclosure in view of what is already known in the art. One skilled in the art will appreciate that various modifications and changes may be made to the specific embodiments described herein without departing from the spirit and scope of the present disclosure. Thus, the specification and drawings are to be regarded as illustrative and exemplary rather than restrictive or all-encompassing, and all such modifications to the specific embodiments described herein are intended to be included within the scope of the present disclosure. Yet further, it should be understood that the detailed description that follows describes exemplary embodiments and is not intended to be limited to the expressly disclosed combination(s). Therefore, unless otherwise noted, features disclosed herein may be combined together to form additional combinations that were not otherwise described or shown for purposes of brevity.

It should also be noted that one or more exemplary embodiments may be described as a method. Although a method may be described in an exemplary sequence (i.e., sequential), it should be understood that such a method may also be performed in parallel, concurrently or simultaneously. In addition, the order of each formative step within a method may be re-arranged. A described method may be terminated when completed, and may also include additional steps that are not described herein if, for example, such steps are known by those skilled in the art.

As used herein the words "configured" and "operable to" may be used interchangeably.

Figure 1A:
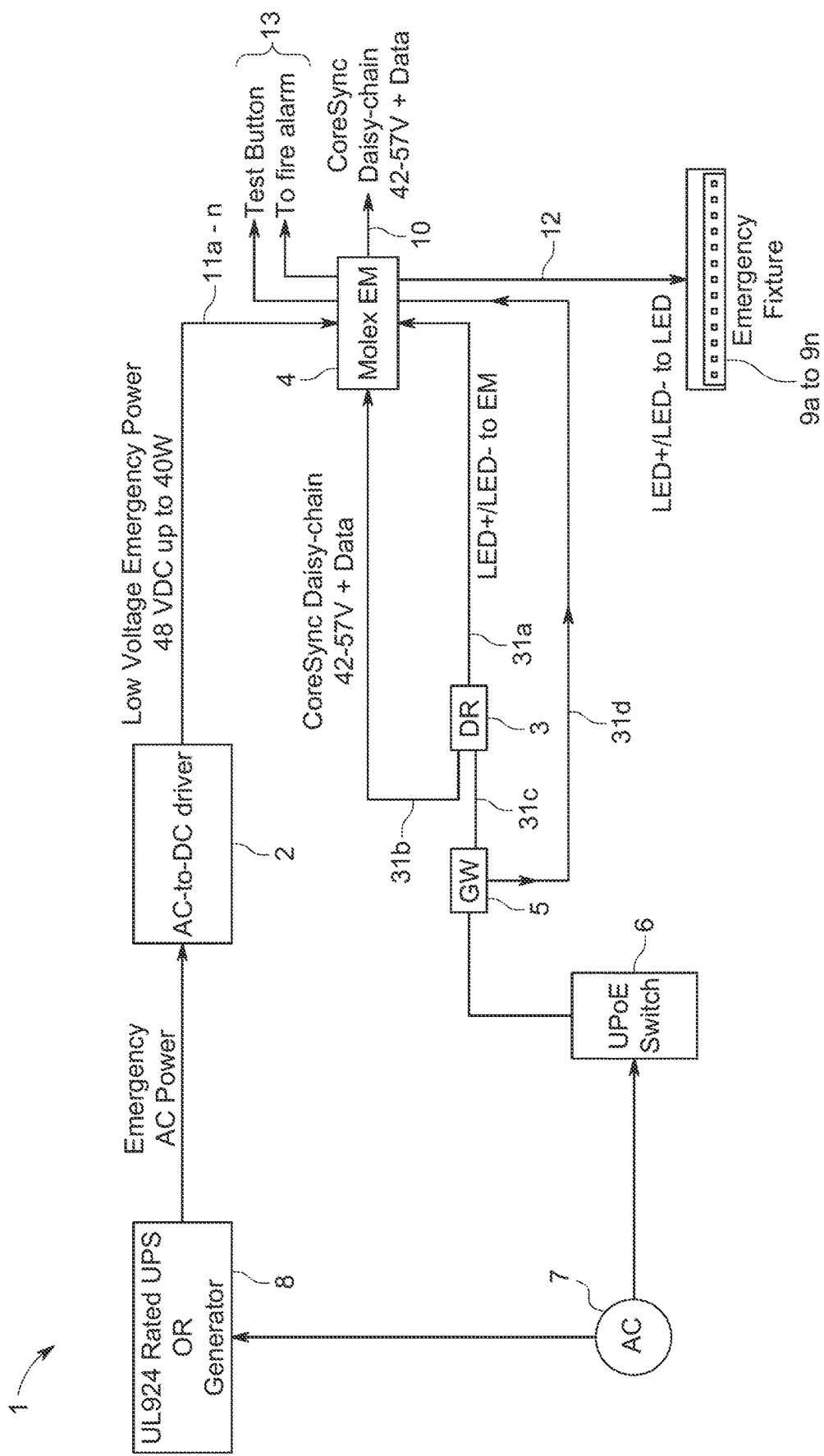
FIG. 1A illustrates an exemplary block diagram of an emergency power control system according to one embodiment.

Referring now to FIG. 1A there is depicted an embodiment of an exemplary, emergency PoE power control system 1. As shown, the system 1 may comprise an electronic AC-to-DC conversion stage 2 (e.g., AC-to-DC-driver or driving circuitry), a primary electronic LED driver or driving circuitry 3, an electronic emergency power control module 4, an electronic Power-over Ethernet (PoE) communications gateway 5, an electronic Universal PoE switch 6, primary Alternating Current (AC) power source 7, secondary or emergency AC power source 8 and emergency fixtures and load devices 9a to 9n (hereafter collectively referred to as "load devices").

In the embodiment depicted in FIG. 1A, the emergency power distribution module 4 may be configured to receive emergency or secondary DC power (hereafter "emergency DC power") from the AC-to-DC conversion stage 2 via a connection 11a to 11n and primary DC PoE power ("primary DC power") from the primary electronic LED driver or driving circuitry 3 (hereafter "primary DC driver from the combination of the Universal PoE switch 6 and the gateway 5. Further, as described further herein, the module 4 may be operable to monitor the presence of primary DC power from gateway 5.

In an embodiment, as long as the module 4 detects the presence of primary DC power the module 4 may not require emergency DC power. On the other hand, when the module 4 detects the loss of primary DC power the module 4 may be operable to connect to emergency DC power.

In more detail, to provide primary DC power to the module 4 the UPoE switch 6 may be operable to convert primary AC power from source 7 to primary DC power and then supply such power to the module 4 via gateway 5 and primary driver 3. Further to provide emergency DC power to the module 4, in one embodiment the AC-to-DC conversion stage 2 may be operable to receive emergency AC power from the secondary or emergency AC power source 8 (e.g., a UL 924 rated uninterruptible power supply (UPS) or a UL 924 gasoline/diesel powered generator or both) and convert the received AC power into emergency DC power (e.g., 48 VDC up to 96 Watts) that is then used to provide emergency DC power to the module 4.

In an embodiment, the emergency power control module 4 may be electrically connected to one or more electronic sensors, motors or other electrical, electronic or electro-mechanical devices (e.g., Molex Core-Sync® devices) via electrical connection 10. In an embodiment, the connection 10 may be configured as one or more daisy-chained connections, for example. Further, the emergency power control module 4 may be operable to provide either the primary DC power or emergency DC power to one or more electrical load devices (e.g., LED, solid state lights) 9a to 9n connected to module 4.

Though the AC-to DC conversion stage 2 may be co-located with the module 4, this is merely exemplary. Further, while only one module 4 is depicted as being powered by emergency DC power from stage 2 in FIG. 1A, this is also merely exemplary. In another embodiment the conversion stage 2 may be located remote from the module 4 (e.g., within a secure location that is not in the same telecommunications room as the module 4). In yet another embodiment the conversion stage 2 may be operable to provide emergency DC power to one or more modules 4a to 4n (where "n" indicates the last module being powered).

Figure 1B:
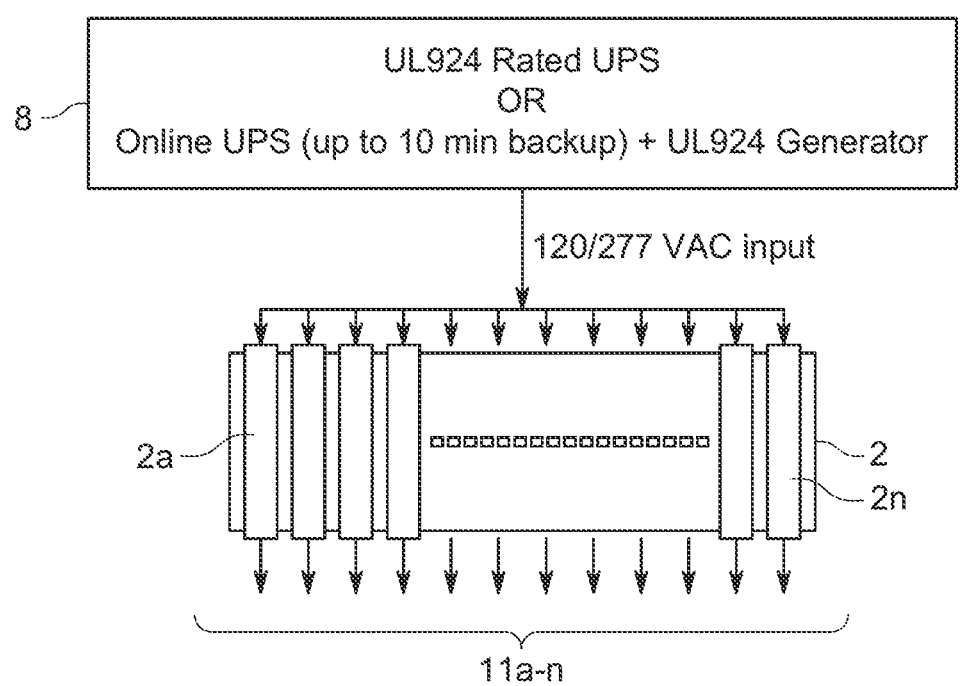
FIG. 1B illustrates a component of the emergency power control system in FIG. 1A.

In more detail, referring now to FIG. 1B there is shown another view of an exemplary AC-to-DC conversion stage 2. In this embodiment the stage 2 may comprise a plurality of AC-DC conversion units or circuity 2a to 2n (where "n" indicates the last unit) each of which may be operable to receive an emergency AC power signal from the emergency AC power source 8 (e.g., 120V/277 VAC). Thereafter, each unit 2a to 2n may be operable to convert a respective, received AC power signal "(AC power" for short) to a DC power signal ("DC power" for short) and output the DC power (e.g., a 24 or 48 VDC constant voltage signal up to 96 W per unit) as an emergency DC power signal to a respective emergency power control module 4a to 4n via electrical connections 11a to 11n (where "n" is the last connection). Said another way, each unit 2a to 2n may be electrically connected to one emergency power control module 4a to 4n to ensure a one to one connection. Each of the outputs 11a to 11n may sometimes be referred to as a "channel".

It should be understood that the phrases AC or DC power signals may be synonymous with the phrases AC power and DC power. Further, though the primary and emergency power sources 7, 8, are depicted and described as providing AC power, each may alternatively provide DC power. In such a case the AC-to-DC conversion by conversion stage 2 and by AC-to-DC converters within UPoE 6 may be unnecessary.

Figure 1C:
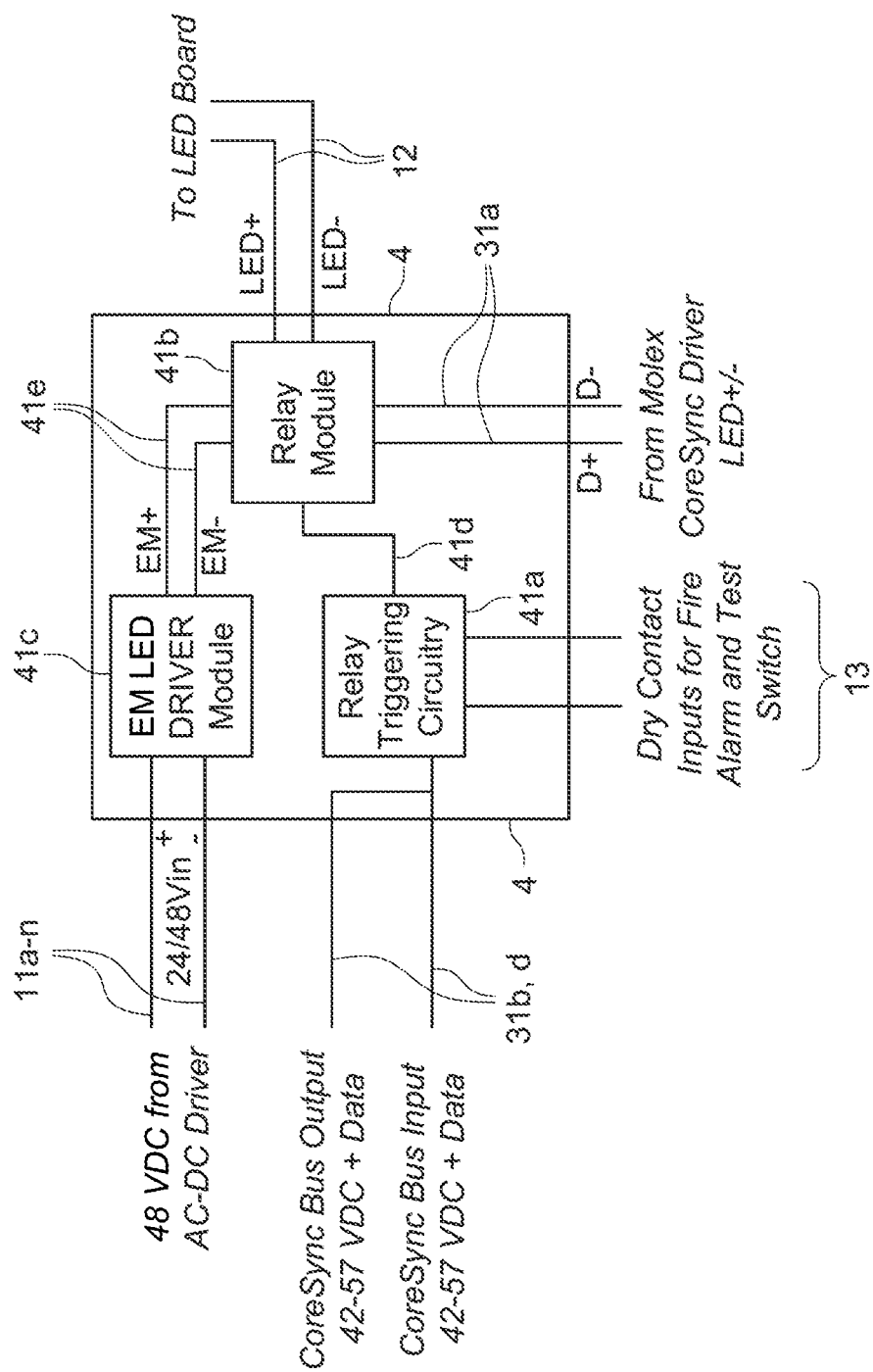
FIG. 1C illustrates an exemplary AC-to-DC conversion stage that may be a part of the system depicted in FIG. 1A as well as other emergency power control systems.

Referring now to FIG. 1C an exemplary emergency power control module 4 may comprise an on-board, emergency electronic driving module (e.g. LED driving module, hereafter "emergency driving module") 41c, an on-board relay module or circuitry 41b and on-board relay control circuitry 41a for detecting the presence and absence of primary DC power and controlling the on-board relay module (e.g., energized state or mode of the relay module 41b) in order to connect the primary DC power or emergency DC power to the one or more load devices 9a to 9n.

In more detail, relay control circuitry 41a may be operable to detect that primary DC power may be present or absent at the inputs 31a of relay module 41b by sensing signals received via connections 31b, 31d (e.g., Core Sync® bus input/output signals) for example. When the circuitry 41a detects signals indicating that primary DC power is no longer present (i.e., it is absent), circuitry 41a may be operable to generate and send one or more first relay control signals via electrical connection 41d to relay module 41b.

Module 41b may comprise one or more electronic relays, for example. Upon receiving such control signals indicating that primary DC power is not, or is no longer, present (collectively "not present"), one or more of the relays within module 41b may be operable to change their energized state (e.g., energized, de-energized) depending upon the presence or absence of primary DC power to, for example, disconnect from inputs 31a that is providing primary DC power and connect to inputs 41e that is providing emergency DC power via emergency electronic driving module 41c, for example.

Conversely, once relay control circuitry 41a detects that primary DC power is present, or is again present, (collectively "present") at the inputs 31a of relay module 41b by sensing signals received via connections 31b, 31d (e.g., Core Sync® bus input/output signals, 42-57 VDC and data) for example, the circuitry 41a may be operable to generate and send one or more second relay control signals via electrical connection 41d to relay module 41b. Upon receiving such second control signals indicating that primary DC power is present, one or more of the relays within module 41b may be operable to disconnect from inputs 41e that is providing emergency DC power and re-connect or connect to inputs 31a that is providing primary DC power, for example.

Figure 2A:
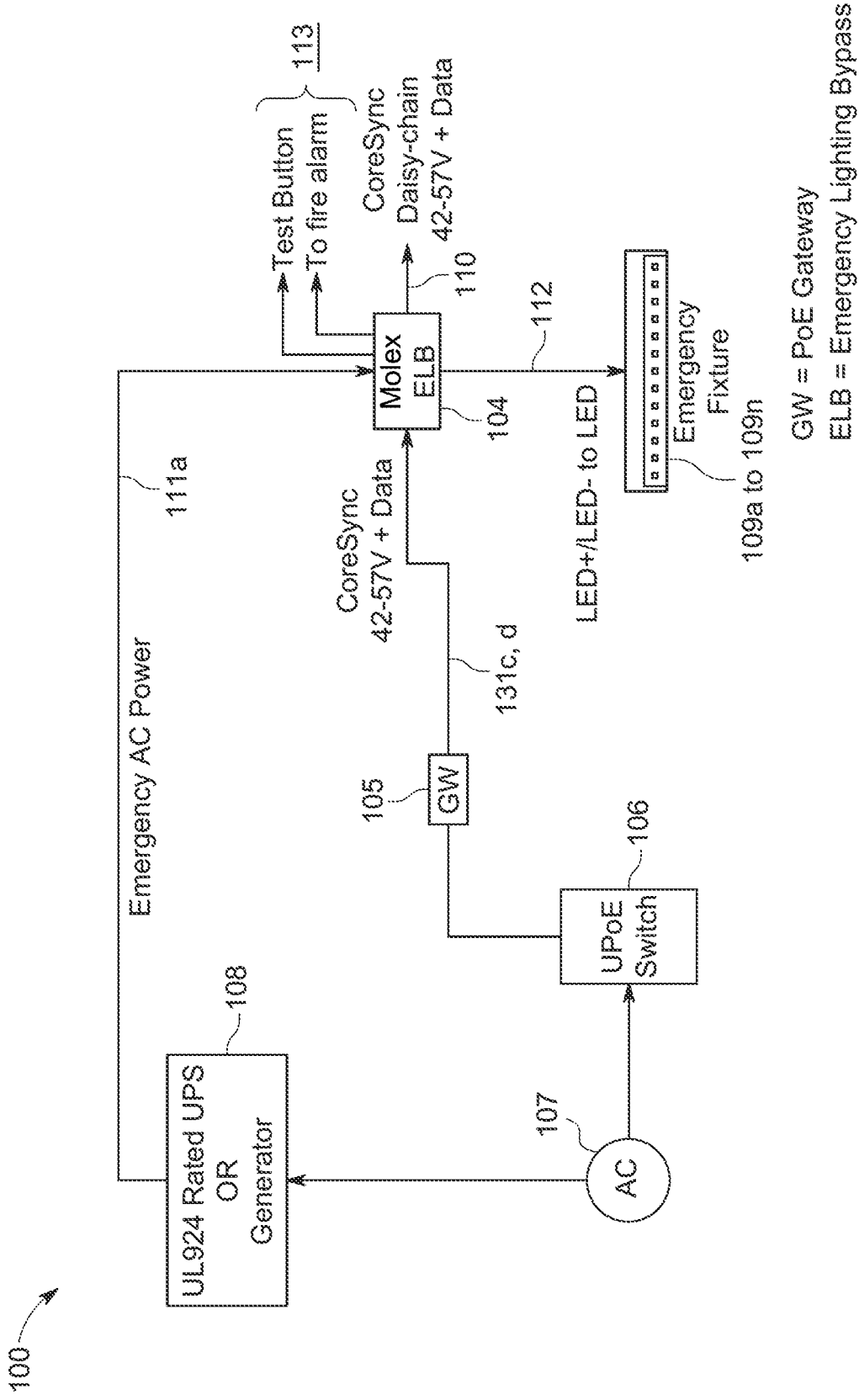
FIG. 2A illustrates an exemplary block diagram of another emergency power control system according to another embodiment.

Referring now to FIG. 2A there is depicted another embodiment of an exemplary, emergency power control system 100. As shown, the system 100 may comprise an electronic emergency power control and driving module 104, an electronic PoE communications gateway 105, an electronic Universal PoE switch 106, primary AC power source 107, secondary or emergency AC power source 108 and emergency fixtures and one or more load devices 109a to 109n (hereafter collectively referred to as "load devices").

Figure 2B:
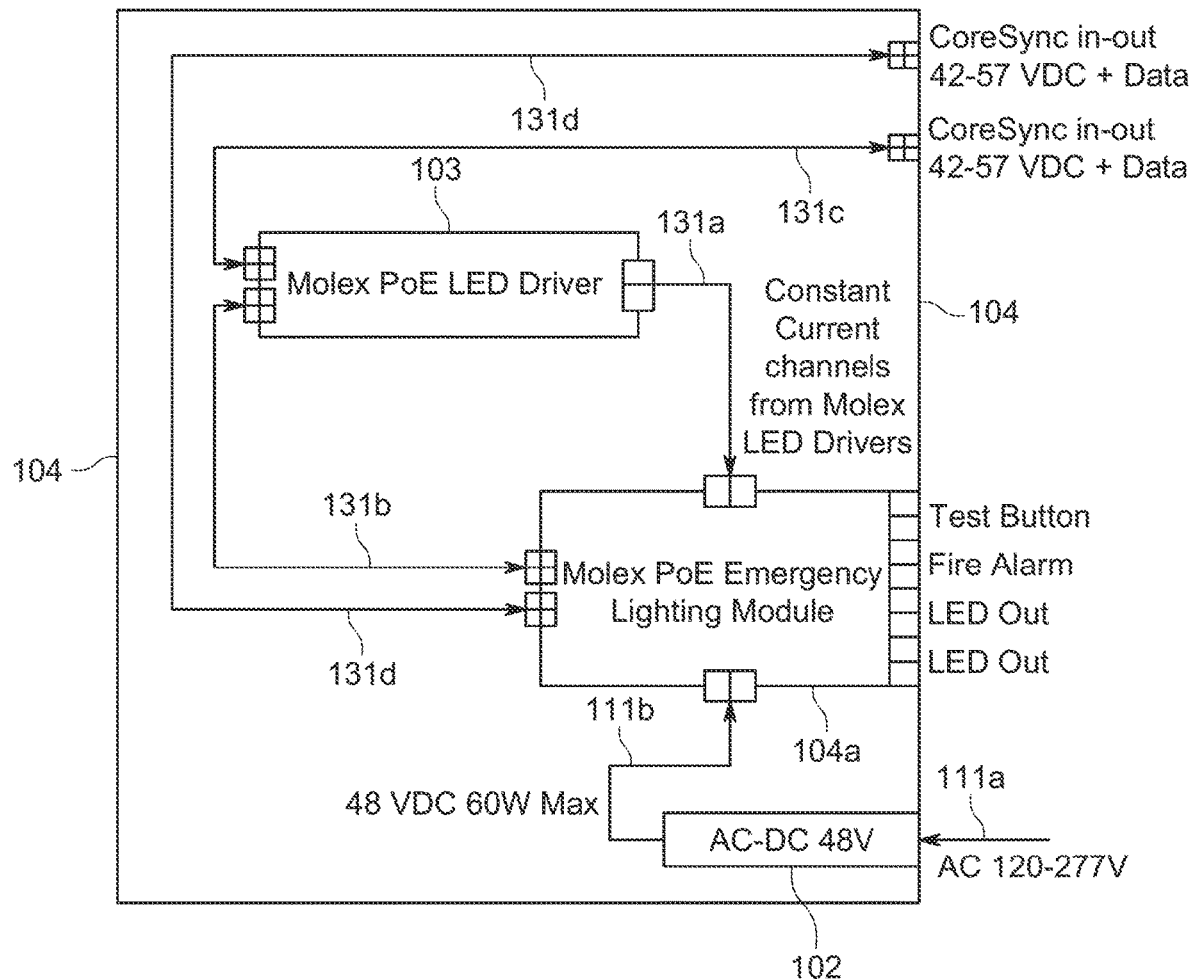
FIG. 2B illustrates an exemplary block diagram of a component of the system depicted in FIG. 2B.

FIG. 2B depicts an exemplary block diagram of the emergency power control and driving module 104 according to one embodiment. As shown, the module 104 may comprise an integral, primary electronic DC power driving module 103 (e.g., LED driving module), an integral, electronic AC-to-DC conversion stage 102 and an integral, electronic relay control module 104a. As used with respect to this embodiment, the phrase "integral" means housed within the same physical enclosure, where in this case the enclosure is module 104. In comparison, the emergency power control systems in FIGS. 1A to 1C include driving circuitry and AC-to-DC conversion stages that are not integral with a control module (i.e., they are external to the control modules).

Control module 104a may be configured to receive primary DC power via integral connection 131a (i.e., a constant current output) from the integral driving module 103 and emergency or secondary DC power (hereafter "emergency DC power") from the integral AC-to-DC conversion stage 102 via integral connection 111b. Further, the integral, electronic relay control module 104a may be operable to monitor the presence and absence of primary DC power from gateway 105 and driving module 103 by monitoring signals input via connections 131b, 131d (e.g., Core Sync® bus input/output signals, 42-57 VDC and data). In an embodiment, as long as the relay control module 104a detects the presence of primary DC power, emergency DC power is not needed. On the other hand, when the relay control module 104a detects the loss of primary DC power (i.e., absence of power) the relay control module 104a may be operable to connect to the emergency DC power from AC-to-DC conversion stage 102.

In more detail, in one embodiment, to provide primary DC PoE power the UPoE switch 106 may be operable to convert primary AC power from primary AC power source 107 to primary DC power and then supply such power to the gateway 105 that then provides primary DC PoE power via connection 131c (e.g., Core Sync® bus input/outputs) to the integral driving module 103. Thereafter, module 103 may be operable to provide primary DC power via integral connection 131a (i.e., a constant current output) to relay control module 104a which in turn provides such power to load devices 109a to 109n (e.g., LED, solid state lights), for example. Further to provide emergency DC power to the module 104a, in one embodiment the integral AC-to-DC conversion stage 102 may be operable to receive emergency AC power from the secondary or emergency AC power source 108 (e.g., a UL 924 rated uninterruptible power supply (UPS) or a UL 924 gasoline/diesel powered generator or both) and convert the received, emergency AC power into emergency DC power (e.g., 48 VDC up to 96 Watts) that is then used to provide emergency DC power to the module 104a.

In an embodiment, the emergency power control module 104 may be electrically connected to one or more electronic sensors, motors or other electrical, electronic or electromechanical devices (e.g., Molex Core-Sync® devices) via electrical connection 110. In an embodiment, the connection 110 may be configured as one or more daisy-chained connections, for example.

It should be understood that the primary and emergency power sources 107, 108, though depicted and described as providing AC power, may provide DC power. In such a case the AC-to DC conversion by integral conversion stage 102 and by AC-to-DC converters within UPoE 106, for example, may be unnecessary.

Figure 2C:
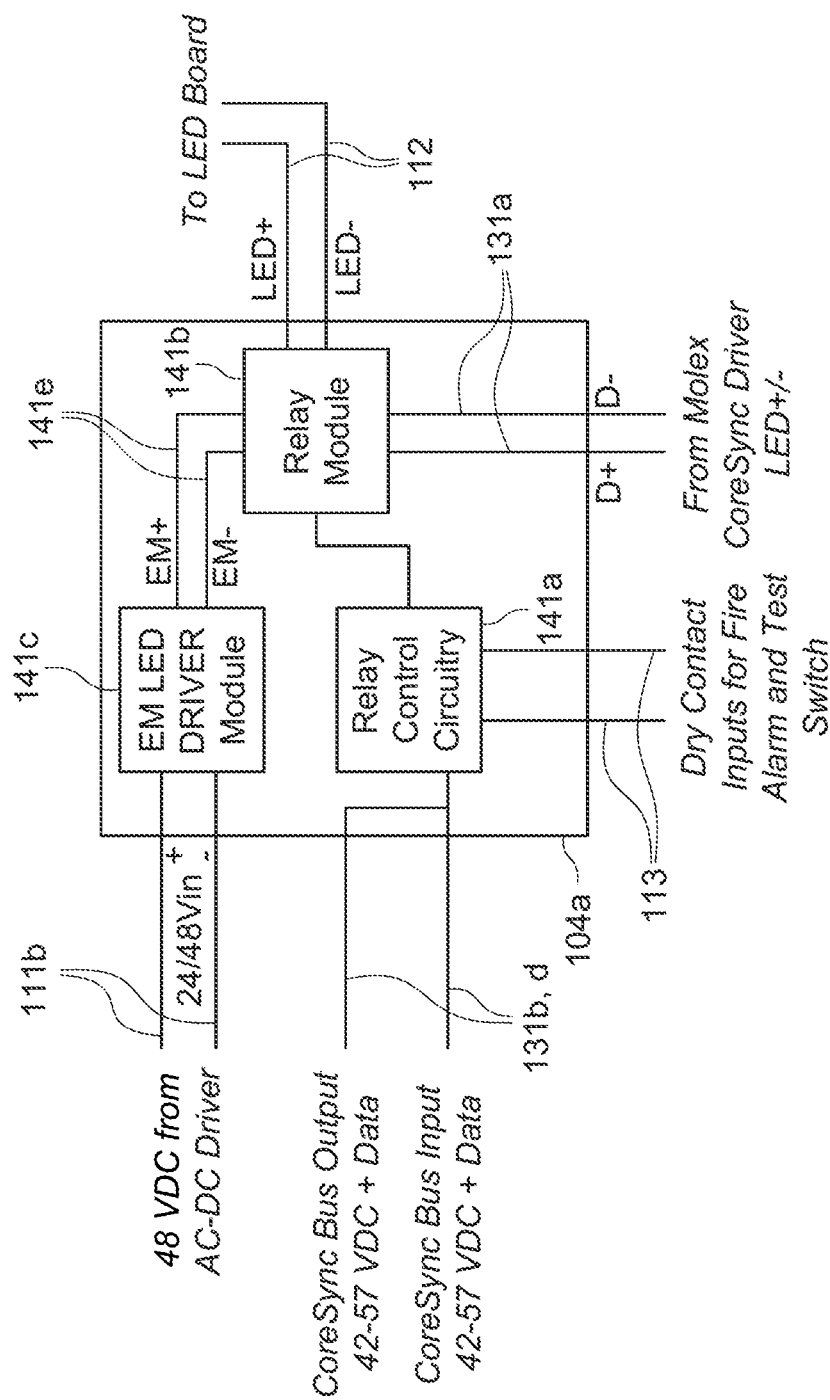
FIG. 2C illustrates an exemplary block diagram of an exemplary, integral relay control module that may be used as a part of the component in FIG. 2B.

Referring now to FIG. 2C there is depicted a simplified block diagram of an exemplary emergency power relay control module 104a according to one embodiment.

As shown, the relay control module 104a may comprise an on-board, emergency electronic driving module (e.g. LED driving module, hereafter "emergency driving module") 141c, an on-board relay module or circuitry 141b and on-board relay control circuitry 141a for detecting the presence and absence of primary DC power and controlling the on-board relay module (e.g., controlling the energized state or mode of the relay module 141b) in order to connect the primary DC power or emergency DC power to the one or more load devices 109a to 109n.

In more detail, relay control circuitry 141a may be operable to detect that primary DC power may be present or absent at the inputs 131a of relay module 141b by sensing signals received via connections 131b, 131d (e.g., Core Sync® bus input/output signals, 42-57 VDC) for example. When the circuitry 141a detects signals indicating that primary DC power is no longer present (i.e., it is absent), circuitry 141a may be operable to generate and send one or more first relay control signals via electrical connection 141d to relay module 141b.

In an embodiment, module 141b may comprise one or more electronic relays. Upon receiving such control signals indicating that primary DC power is not, or is no longer, present (collectively "not present"), the one or more of the relays within module 141*b* may be operable to change their energized state (e.g., energized, de-energized) to disconnect from input 131*a* that is providing primary DC power and connect to input 141*e* that is providing emergency DC power, for example.

Conversely, once relay control circuitry 141*a* detects that primary DC power is present, or again present, (collectively "present") at the inputs 131*a* of relay module 141*b* by sensing signals received via connections 131*b*, 131*d* (e.g., Core Sync® bus input/output signals at 42 to 57 VDC) for example, the circuitry 141*a* may be operable to generate and send one or more second relay control signals via electrical connection 141*d* to relay module 141*b*. Upon receiving such second control signals indicating that primary DC power is present, one or more of the relays within module 141*b* may be operable to change their energized state (e.g., energized, de-energized) to disconnect from inputs 141*e* that is providing emergency DC power and re-connect or connect to inputs 131*a* that is providing primary DC power, for example.

Figure 3A:
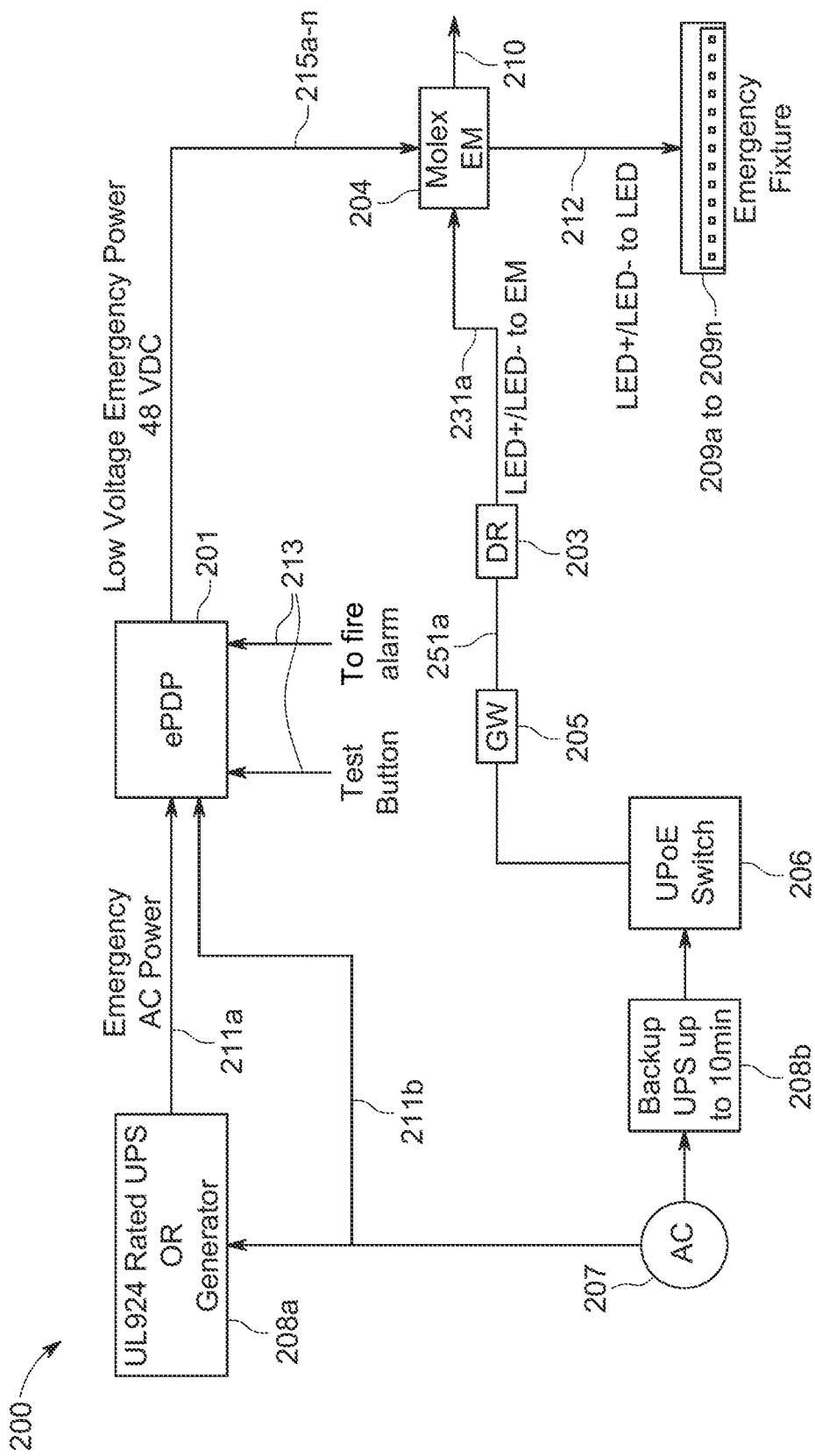
FIG. 3A illustrates an exemplary block diagram of an additional emergency power control system according to an embodiment.

Referring now to FIG. 3A there is depicted an additional embodiment of an exemplary, emergency power control system 200. As shown, the system 200 may comprise an electronic power distribution section 201 for distributing emergency DC power as described herein, a primary electronic LED driver or driving circuitry 203, an electronic emergency power control module 204, an electronic Power-over Ethernet (PoE) communications gateway 205, an electronic Universal PoE switch 206, primary AC power source 207, a first secondary or emergency AC power source 208*a* (e.g., 120V/277 VAC), a second secondary or emergency AC power source 208*b* (e.g., 120V/277 VAC), and emergency fixtures and one or more load devices 209*a* to 209*n* (hereafter collectively referred to as "load devices", e.g., one or more solid-state, LED lights). Though the electronic power distribution section 201 may be co-located with the module 204, this is merely exemplary. In another embodiment section 201 may be located remote from the module 204.

Figure 3B:
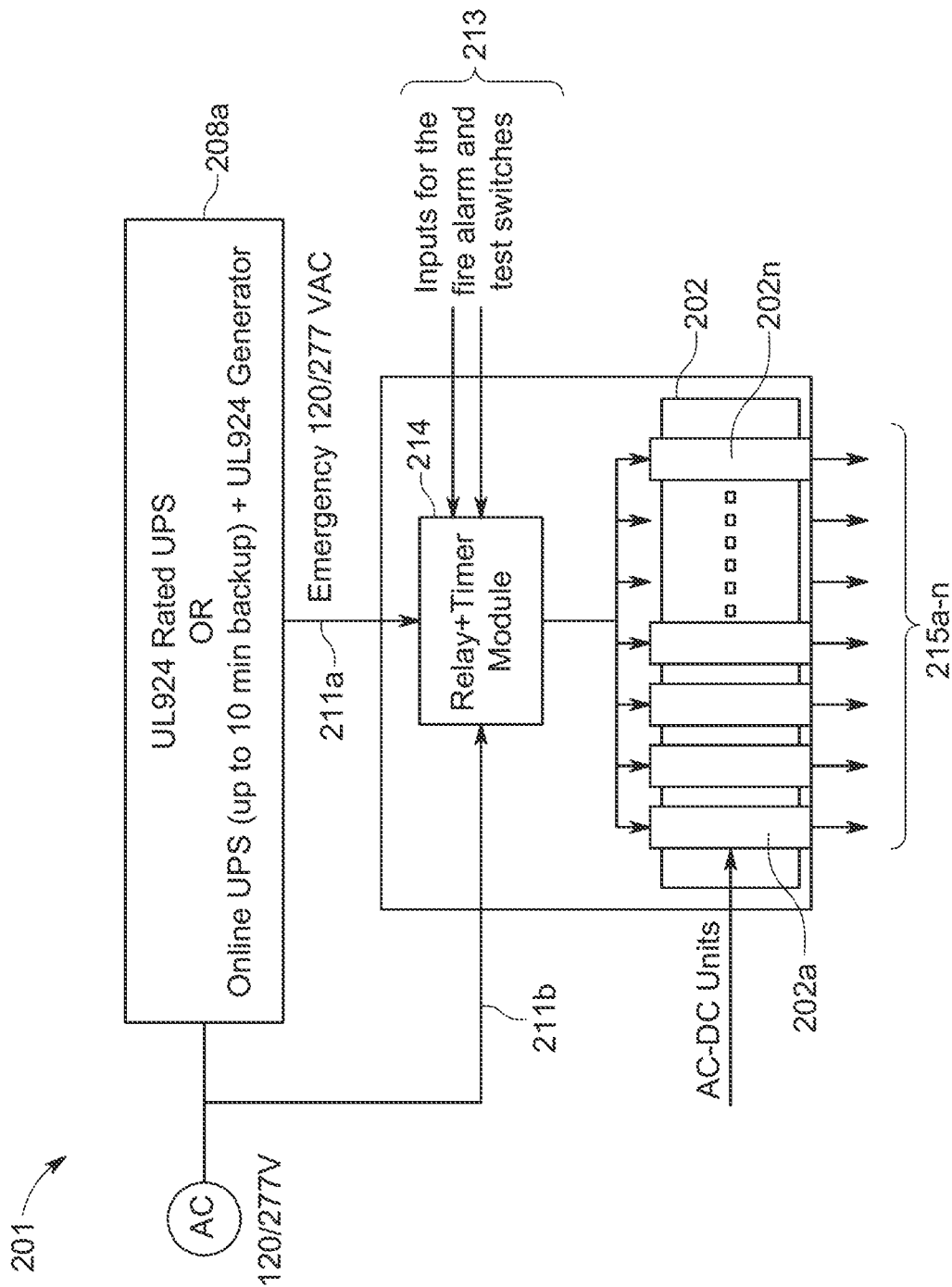
FIG. 3B illustrates an exemplary block diagram of a component of the system depicted in FIG. 3A.

In the embodiment depicted in FIG. 3A, the emergency power control module 204 may be configured to receive emergency or secondary DC power (hereafter "emergency DC power") from AC-to-DC conversion stages within electronic power distribution section 201 (see elements 202*a* to 202*n* of FIG. 3B and primary DC PoE power ("primary DC power") from the primary electronic LED driver or driving circuitry 203 (hereafter "primary DC driver") via connection 231*a*. As long as the module 204 receives primary DC PoE power, the module 204 may not require emergency DC power. On the other hand, when the module 204 is not receiving primary DC power the module 204 may be operable to connect to emergency DC power.

The emergency power control module 204 may be operable to provide either the primary DC power or emergency DC power to the electrical load devices 209*a* to 209*n* connected to module 204. In an embodiment, the emergency power control module 204 may be electrically connected to one or more electronic sensors, motors or other electrical, electronic or electro-mechanical devices (e.g., Molex Core-Sync® devices) via electrical connection 210, where the connection 210 may be configured as one or more daisy-chained connections, for example.

In more detail, to provide primary DC power to the module 204 the UPoE switch 206 may be operable to convert primary AC power from source 207 to primary DC power and then supply such power to the module 204 via gateway 205 and primary driver 203, for example.

Referring now to FIG. 3B, to provide emergency DC power to the module 204, in one embodiment the electronic power distribution section 201 may comprise AC-to-DC conversion units or circuitry 202*a* to 202*n* each of which may be operable to receive emergency AC power from the first emergency AC power source 208*a* (e.g., a UL 924 rated uninterruptible power supply (UPS) or a UL 924 gasoline/diesel powered generator or both). Upon receiving AC power the units 202*a* to 202*n* may be operable to convert received AC power into emergency DC power (e.g., 48 VDC up to 96 Watts) that is then used to distribute emergency DC power to at least module 204.

As shown, the electronic power distribution section 201 may also comprise an electronic power sensing module 214 that may be operable to detect the presence or absence of primary AC power by sensing signals received via connections 211*b*, for example. In an embodiment, sensing module 214 may comprise one or more electronic relays that are operable to change their energized state (e.g., energized, de-energized) depending upon the presence or absence of primary AC power received via connections 211*b*.

When the module 214 detects signals indicating that primary AC power is not, or no longer, present (collectively "not present") at a voltage sufficient to continue to power load devices 209*a* to 209*n* under standard PoE operating conditions, one or more of the electronic relays that are a part of module 214 may be operable to change their energized state in order to connect to inputs 211*a* that is providing emergency AC power to the AC-to-DC conversion units or circuitry 202*a* to 202*n*.

Conversely, once module 214 detects signals indicating that primary AC power is present, or again present, (collectively "present") at the inputs 211*b* at a voltage sufficient to power load devices 209*a* to 209*n* under standard PoE operating conditions, the one or more electronic relays that are a part of module 214 may be operable to change their energized state in order to disconnect inputs 211*a* that is providing emergency AC power to the AC-to-DC conversion units or circuitry 202*a* to 202*n* because they may no longer be needed.

In an embodiment, each unit 202*a* to 202*n* may be operable to convert emergency AC power to DC power signals (e.g., a 24 or 48 VDC constant voltage signal up to 96 W per unit) at a voltage sufficient to power load devices 209*a* to 209*n* at a rated output and output such DC power signals via connections 215*a* to 215*n* to control module 214. Said another way, each unit 202*a* to 202*n* may be electrically connected to one emergency power control module ensuring a one to one connection. Each of the connections 215*a* to 215*n* may sometimes be referred to as a "channel".

It should be understood that the systems described herein (e.g., systems 1, 100 and 200) may be operable to power a range of devices, such as LED lights/light fixtures, where the current and voltage for a particular LED light/fixture may differ depending on the type of LED light fixture that is used (i.e., different size LED, different wattage output). Thus, the term "at a rated output" includes a system 1,100, 200 that outputs power at a current and voltage that correctly matches current and voltage requirements of a particular LED light fixture or another device that receives power form the system 1,100, 200.

It should be further understood that the primary and first and second emergency power sources 207, 208*a*, 208*b*, though depicted and described as providing AC power, may provide DC power. In such a case the AC-to DC conversion by units 202a to 202n and by AC-to-DC converters within UPoE 206, for example, may be unnecessary.

Figure 3C:
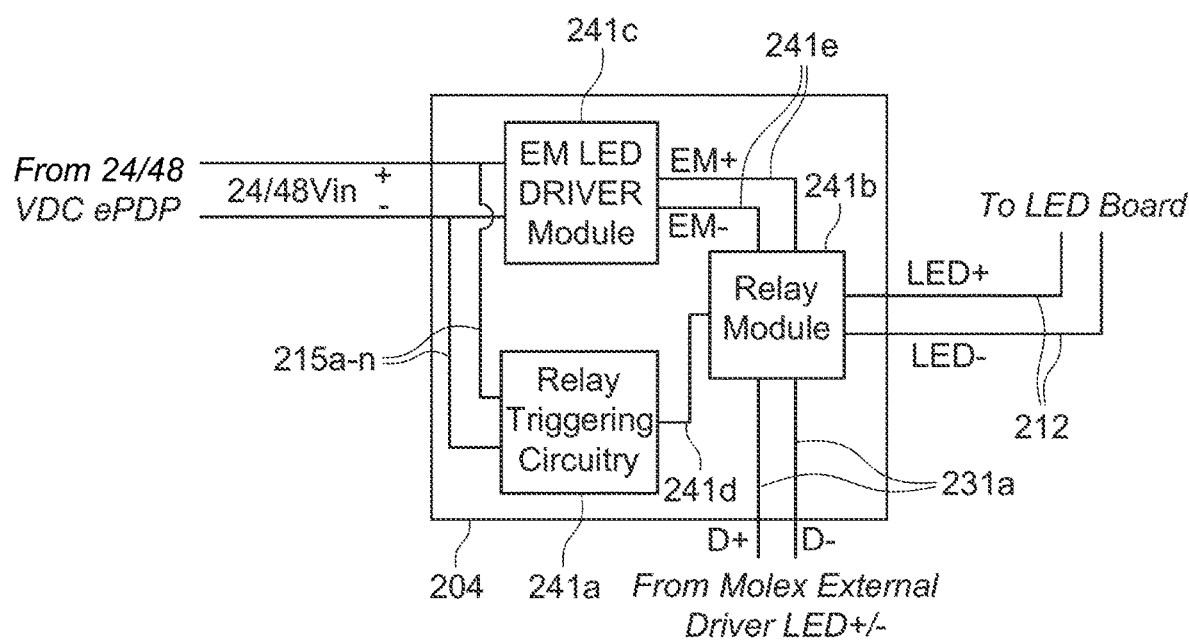
FIG. 3C illustrates an exemplary block diagram of an exemplary relay control module that may be used as a part of the system in FIG. 3A.

Referring now to FIG. 3C there is depicted a simplified block diagram of the exemplary emergency power control module 204. As shown, the module 204 may comprise an on-board emergency electronic driving module (e.g. LED driving module, hereafter "emergency driving module") 241c, an on-board relay module or circuitry 241b and on-board relay triggering circuitry 241a for triggering the circuitry 241b to switch from primary DC power to emergency DC power or vice-versa, for example. As used in this embodiment, "on-board" means mounted on, or present on, one and the same printed circuit board assembly.

Unlike the embodiments discussed in FIGS. 1A to 2C, in this embodiment the on-board relay triggering circuitry 241a does not need to be operable to sense the presence or absence of primary AC or DC power because such a function may be completed by the electronic power distribution section 201. Instead, triggering circuitry 241a may be operable to sense the presence or absence of emergency DC power from module 201, for example.

In more detail, upon detecting that emergency DC power is present at the inputs 215a at a voltage sufficient to power load devices 209a to 209n, the circuitry 241a may be operable to generate and send one or more first relay control signals via electrical connection 241d to relay module 241b. Upon receiving such first control signals indicating that emergency DC power is present and has a voltage sufficient to power load devices 209a to 209n at a rated output, one or more of the relays within module 241b may be operable to energize or de-energize and thereby disconnect from inputs 231a that is providing primary DC power and connect to inputs 241e that is providing emergency DC power a voltage sufficient to power load devices 209a to 209n at a rated output, for example.

Conversely, once triggering circuitry 241a detects that emergency DC power is not present at the inputs 215a at a voltage sufficient to power load devices 209a to 209n at a rated output, the circuitry 241a may be operable to generate and send one or more second relay control signals via electrical connection 241d to relay module 241b. Upon receiving such second control signals indicating that emergency DC power at a voltage sufficient to power load devices 209a to 209n at a rated output is not present, one or more of the relays within module 241b may be operable to energize or de-energize in order to disconnect from inputs 241e that is providing emergency DC power and re-connect to inputs 231a that is providing primary DC power, for example.

It may take an amount of time for a conversion unit 202a to 202n to generate emergency DC power signals having a voltage that is sufficient to power load devices 209a to 209n at a rated output. Accordingly, in an embodiment, in the event primary AC power source 207 is no longer available, and while a conversion unit 202a to 202n is starting up and for a time thereafter (e.g., 10 minutes) until the voltage provided is sufficient to power load devices 209a to 209n at a rated output, the second emergency AC power source 208b may provide supplemental AC power to switch 206 that converts the supplemental AC power into supplemental DC power and provides that supplemental power to module 204 which is utilized by relay module 241b to supply load devices 209a to 209n at a rated output.

Further, it may be necessary for the load devices 209a to 209n to continue to receive emergency DC power from section 201 even after the section 201 has detected that primary AC power has been reconnected or is now being provided from the primary AC source 207 until the primary AC power is at a voltage sufficient to power load devices 209a to 209n at a rated output Accordingly, in an embodiment, while primary AC power source 207 is starting up and for a time thereafter (e.g., 10 minutes) until the voltage provided is sufficient to power load devices 209a to 209n at a rated output, the electronic power distribution section 201 may continue to provide emergency DC power to module 204 until module 214 detects signals indicating that primary AC power is now present at a voltage sufficient to power load devices 209a to 209n at a rated output.

Still further, in an embodiment the module 204 may be operable to control the level or value of electrical current being output to the load devices 209a to 209n (e.g. to LED lights). For example, module 204 may be operable to control the electrical current to a rated output sufficient to allow load devices 209a to 209n to output a minimum amount of light in the event of emergency.

Figure 3D:
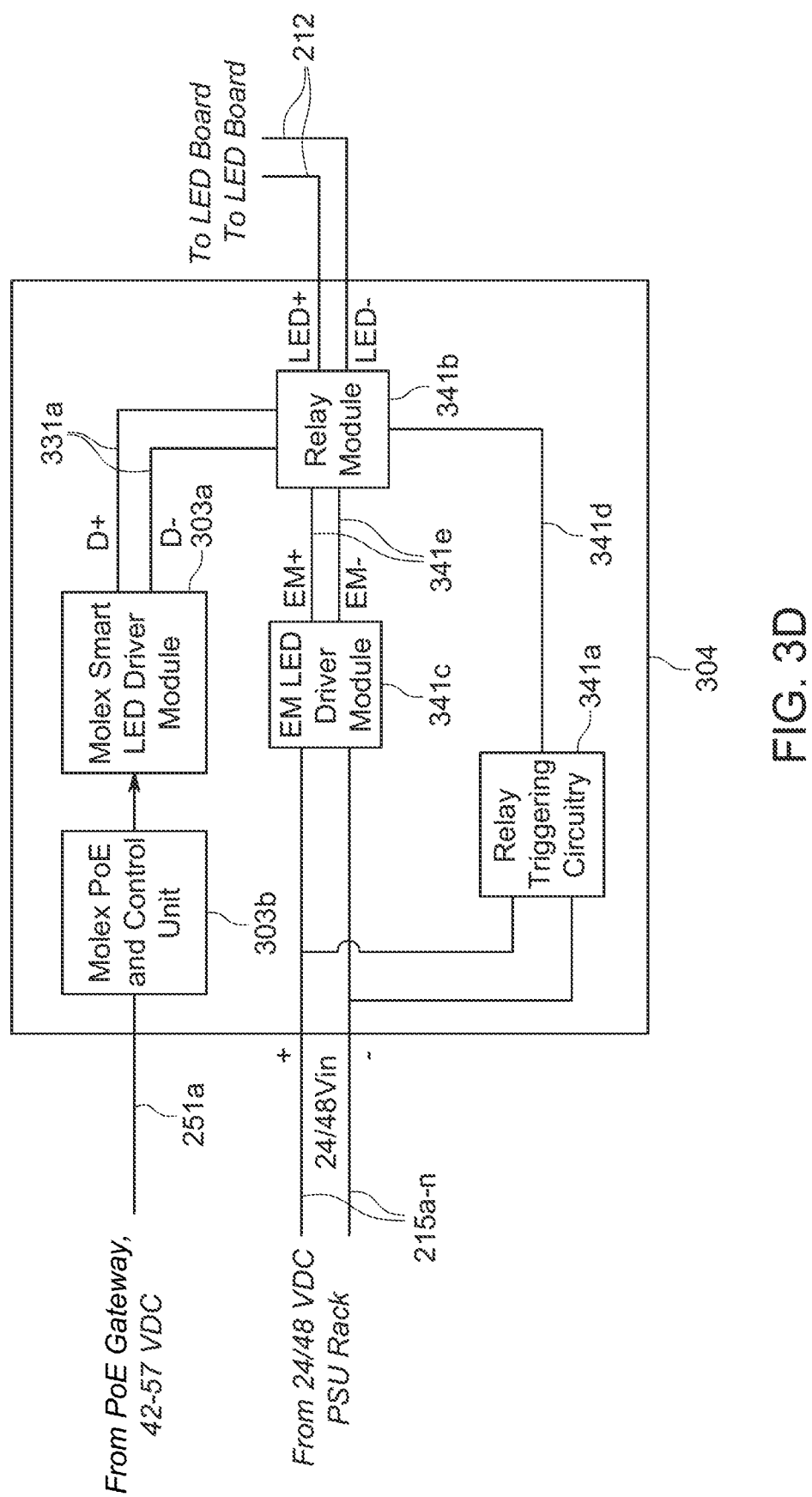
FIG. 3D illustrates an exemplary block diagram of an additional, exemplary relay control module that may be used as a part of the system in FIG. 3A according one embodiment.
Figure 3E:
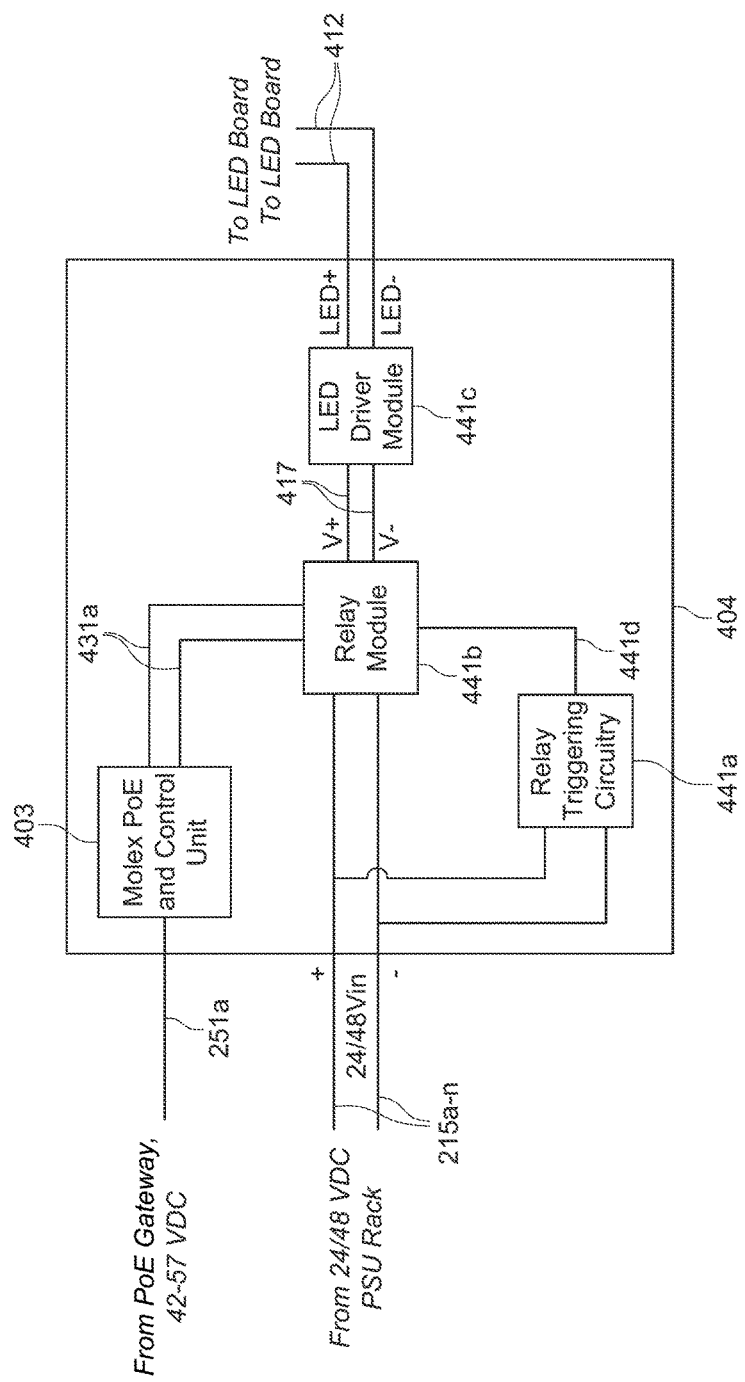
FIG. 3E illustrates an exemplary block diagram of another exemplary relay control module that may be used as a part of the system in FIG. 3A according to a second embodiment.

Referring now to FIGS. 3D and 3E there are depicted exemplary simplified block diagrams of additional, exemplary relay control modules 304, 404 that may be used as a part of the system 200 in FIG. 3A.

In the embodiment illustrated in FIG. 3D the exemplary emergency power control module 304 may comprise on-board, primary electronic LED driver 303a and control circuitry 303b rather than external, primary electronic LED driver circuitry 203. Further, module 304 may comprise an on-board, emergency electronic driving module (e.g. LED driving module, hereafter "emergency driving module") 341c, an on-board relay module or circuitry 341b and an on-board relay triggering circuitry 341a for triggering the circuitry 341b to switch from primary DC power to emergency DC power or vice-versa, for example.

In an embodiment, control circuitry 303b may comprise a microcontroller, communication circuitry and power circuitry and may be operable to control primary PoE power being provided to primary electronic LED driver circuitry 303a to generate a controlled, LED current output to load devices 209a to 209n.

Similar to on-board relay triggering circuitry 241a, circuitry 341a does not need to be operable to sense the presence or absence of primary AC or DC power because that function may be completed by the electronic power distribution section 201. Instead, triggering circuitry 341a may be operable to sense the presence or absence of emergency DC power from module 201.

In more detail, once circuitry 341a detects that emergency DC power is present at the inputs 215a to n at a voltage sufficient to power load devices 209a to 209n, the circuitry 341a may be operable to generate and send one or more first relay control signals via electrical connection 341d to relay module 341b. Upon receiving such first control signals indicating that emergency DC power is present, and has a voltage sufficient to power load devices 209a to 209n at a rated output, one or more of the relays within module 341b may be operable to energize or de-energize and thereby disconnect from inputs 331a that is providing primary DC power and connect to inputs 341e that is providing emergency DC power at a voltage sufficient to power load devices 209a to 209n at a rated output for example.

Conversely, once triggering circuitry 341a detects that emergency DC power is not present at the inputs 215a to n at a voltage sufficient to power load devices 209a to 209n at a rated output, the circuitry 341a may be operable to generate and send one or more second relay control signals via electrical connection 341d to relay module 341b. Upon receiving such second control signals indicating that emergency DC power at a voltage sufficient to power load devices 209a to 209n at a rated output is not present, one or more of the relays within module 341b may be operable to energize or de-energize in order to disconnect from inputs 341e that is providing emergency DC power and re-connect or connect to inputs 331a that is providing primary DC power, for example.

The on-board, primary electronic LED driver 303a and control circuitry 303b and on-board emergency driver 341c, where both drivers 303a, 341c are configured before the electronic on-board relay module 341b in module 304 may be replaced with an on-board, primary electronic LED driver control or circuitry 403 and a single electronic, on-board LED driver or circuitry 441c that is positioned after electronic, on-board relay module 441b, as shown in FIG. 3E.

In an embodiment, control circuitry 403 may comprise a microcontroller, communication circuitry and power circuitry and may be operable to control primary DC PoE power being provided to electronic LED driver 441c to generate a controlled, LED current output to load devices 209a to 209n.

Similar to on-board relay triggering circuitry 341a, circuitry 441a does not need to be operable to sense the presence or absence of primary AC or DC power because this function may be completed by the electronic power distribution section 201. Instead, triggering circuitry 441a may be operable to sense the presence or absence of emergency DC power from module 201, for example.

In more detail, once circuitry 441a detects that emergency DC power is present at the inputs 215a to n at a voltage sufficient to power load devices 209a to 209n, the circuitry 441a may be operable to generate and send one or more first relay control signals via electrical connection 441d to relay module 441b. Upon receiving such first control signals indicating that emergency DC power is present and has a voltage sufficient to power load devices 209a to 209n at a rated output, one or more of the relays within module 441b may be operable to energize or de-energize and thereby disconnect from inputs 431a that is providing primary DC power and connect to inputs 215a to n that is providing emergency DC power at a voltage sufficient to power load devices 209a to 209n at a rated output for example.

Conversely, once triggering circuitry 441a detects that emergency DC power is not present at the inputs 215a to n at a voltage sufficient to power load devices 209a to 209n at a rated output the circuitry 441a may be operable to generate and send one or more second relay control signals via electrical connection 441d to relay module 441b. Upon receiving such second control signals indicating that emergency DC power at a voltage sufficient to power load devices 209a to 209n at a rated output is not present, one or more of the relays within module 441b may be operable to energize or de-energize in order to disconnect from inputs 215a to n that is providing emergency DC power and re-connect or connect to inputs 431a that is providing primary DC power, for example.

We claim:

1. An emergency Power-over-Ethernet (PoE), power control system comprising:
    an electronic emergency power control module configured to (i) receive emergency DC power from an AC-to-DC conversion stage and primary DC PoE power ("primary DC power") from an electronic, primary DC driver, (ii) monitor the presence and absence of primary DC power, and (iii) provide the primary DC power or the emergency DC power to one or more load devices, wherein the emergency power control module comprises on-board relay control circuitry configured to detect the presence and absence of the primary DC power by sensing a signal received via a communication bus input/output connection.

2. The emergency PoE, power control system as in claim 1 further comprising an electronic AC-to-DC conversion stage.

3. The emergency PoE, power control system as in claim 2 wherein the AC-to-DC conversion stage comprises a remote AC-to-DC conversion stage.

4. The emergency PoE, power control system as in claim 2 wherein the AC-to-DC conversion stage comprises a plurality of AC-DC conversion units, each unit operable to receive an emergency AC power signal from an emergency AC power source and convert a respective, received AC power signal to a DC power signal and output the DC power signal as an emergency DC power signal to a respective emergency, PoE power control module.

5. The emergency PoE, power control system as in claim 1 wherein the one or more load devices comprises one or more LED, solid state lights.

6. The emergency PoE, power control system as in claim 1 wherein the on-board relay control circuitry is configured to control an on-board relay module in order to connect primary DC power and/or emergency DC power to the one or more load devices.

7. The emergency PoE, power control system as in claim 1, wherein the on-board relay control circuitry is configured to detect signals indicating that the primary DC power is not present and to generate, and send, one or more first relay control signals to the on-board relay module.

8. The emergency PoE, power control system as in claim 7, wherein the on-board relay module is configured, in response to receiving the first control signals, to disconnect the primary DC power and to connect the emergency DC power.

9. The emergency PoE, power control system as in claim 1, wherein the on-board relay control circuitry is configured to detect signals indicating that the primary DC power is present and to generate, and send, one or more second relay control signals to the on-board relay module.

10. The emergency PoE, power control system as in claim 9 further comprising the on-board relay module, the on-board relay module configured, in response to receiving the second control signals indicating that the primary DC power is present, to disconnect the emergency DC power and connect the primary DC power.

11. The emergency PoE, power control system as in claim 1, wherein the on-board relay control circuitry comprises a microcontroller and a communication circuit.

12. An emergency Power-over-Ethernet (PoE), power control system comprising:
    an electronic emergency power control and driving module comprising, an integral, primary electronic DC PoE power driving module, and an integral, electronic relay control module configured to (i) receive primary DC PoE power ("primary DC power") from the integral driving module and emergency DC power, (ii) monitor the presence and absence of the primary DC power, and (iii) provide the primary DC power or the emergency DC power to one or more load devices, wherein the integral, electronic relay control module is configured to detect the presence and absence of the primary DC power by sensing a signal received via a communication bus input/output connection.

13. The emergency PoE, power control system as in claim 12 further comprising an integral, electronic AC-to-DC conversion stage operable to receive emergency AC power and convert the received, emergency AC power into the emergency DC power.

14. The emergency PoE, power control system as in claim 12 wherein the integral, electronic relay control module comprises an on-board, emergency electronic driving module, an on-board relay module and on-board relay control circuitry, wherein the on-board relay control circuitry is configured to control the on-board relay module, wherein the on-board relay module is operable to connect the primary DC power or emergency DC power to the one or more load devices.

15. The emergency PoE, power control system as in claim 14, wherein the on-board relay control circuitry is further operable to detect signals indicating that the primary DC power is not present and to generate, and send, one or more first relay control signals to the on-board relay module.

16. The emergency PoE, power control system as in claim 15 wherein the on-board relay module is operable to receive the first control signals and to disconnect the primary DC power and connect the emergency DC power.

17. The emergency PoE, power control system as in claim 15 wherein the on-board relay control circuitry is further operable to detect signals indicating that the primary DC power is present and to generate, and send, one or more second relay control signals to the on-board relay module.

18. The emergency PoE, power control system as in claim 17 wherein the on-board relay module is operable to receive the second control signals and to disconnect the emergency DC power and connect the primary DC power.

19. The emergency PoE, power control system as in claim 12 wherein the one or more load devices comprises one or more LED, solid state lights.

20. The emergency PoE, power control system as in claim 12, wherein the integral, electronic relay control module includes an on-board relay control circuitry that includes a microcontroller and a communication circuit.

* * * * *